US011837771B2

(12) United States Patent
Borchani et al.

(10) Patent No.: US 11,837,771 B2
(45) Date of Patent: Dec. 5, 2023

(54) TELECOMMUNICATION CONTROL UNITS (TCUS) HAVING CONTOURED TOP SURFACES TO FOLLOW VEHICLE ROOF CONTOURS

(71) Applicant: MOLEX CVS GRAND BLANC, LLC, Grand Blanc, MI (US)

(72) Inventors: Wassim Borchani, St. Louis, MO (US); Ayman Duzdar, St. Louis, MO (US); Hasan Yasin, St. Louis, MO (US)

(73) Assignee: MOLEX CVS GRAND BLANC, LLC, Grand Blanc, MI (US)

( * ) Notice: Subject to any disclaimer, the term of this patent is extended or adjusted under 35 U.S.C. 154(b) by 408 days.

(21) Appl. No.: 17/254,306

(22) PCT Filed: Jun. 26, 2019

(86) PCT No.: PCT/US2019/039321
§ 371 (c)(1),
(2) Date: Dec. 21, 2020

(87) PCT Pub. No.: WO2020/006127
PCT Pub. Date: Jan. 2, 2020

(65) Prior Publication Data
US 2021/0119316 A1    Apr. 22, 2021

Related U.S. Application Data

(60) Provisional application No. 62/700,011, filed on Jul. 18, 2018, provisional application No. 62/690,739, filed on Jun. 27, 2018.

(51) Int. Cl.
*B60R 11/02* (2006.01)
*H01Q 1/32* (2006.01)
(Continued)

(52) U.S. Cl.
CPC ....... *H01Q 1/1214* (2013.01); *B60R 11/0264* (2013.01); *H01Q 1/3275* (2013.01);
(Continued)

(58) Field of Classification Search
CPC  H01Q 1/3275; H01Q 1/1214; B60R 11/0264; B60R 2011/0043
See application file for complete search history.

(56) References Cited

U.S. PATENT DOCUMENTS

2008/0180332 A1\* 7/2008 Noro .................... H01Q 9/0407
343/713
2015/0071137 A1\* 3/2015 Thiam .................... H01Q 1/521
343/702
(Continued)

FOREIGN PATENT DOCUMENTS

DE       10219222 A1 \* 11/2003 ............. B60R 11/02
DE   102015004203 A1 \*  8/2015 ........... H01Q 1/1214
(Continued)

OTHER PUBLICATIONS

International search report and written opinion received for PCT application No. PCT/US2019/039321, dated Oct. 18, 2019, 14 pages.

*Primary Examiner* — Ricardo I Magallanes

(57) ABSTRACT

Exemplary embodiments are disclosed of telecommunication control units (TCUs) having top surfaces (e.g., defined by mounting brackets, etc.) configured (e.g., curved, non-flat, contoured, etc.) to follow, match, and/or correspond with the contours (e.g., curvatures, non-flat contours, etc.) of vehicle roofs (or other vehicle body walls or mounting surfaces). Also disclosed are exemplary embodiments of TCU mounting brackets configured (e.g., curved, non-flat, contoured, etc.) to follow, match, and/or correspond with the contours (e.g., curvatures, non-flat contours, etc.) of vehicle roofs (or other vehicle body walls or mounting surfaces).

(Continued)

Exemplary methods relating to installation of TCUs to vehicle body walls are disclosed. An exemplary method may include positioning a top surface (e.g., defined by a mounting bracket, etc.) of a telecommunication control unit against the vehicle body wall. The top surface may be configured (e.g., curved, non-flat, contoured, etc.) to match and/or correspond with a contour of the vehicle body wall.

20 Claims, 8 Drawing Sheets

(51) Int. Cl.
     *B60R 11/00*          (2006.01)
     *H01Q 1/12*           (2006.01)

(52) U.S. Cl.
     CPC ............... *B60R 2011/0028* (2013.01); *B60R 2011/0043* (2013.01)

(56) References Cited

U.S. PATENT DOCUMENTS

| | | |
|---|---|---|
| 2015/0123854 A1 | 5/2015 | Chakam et al. |
| 2015/0292614 A1 | 10/2015 | Kim |
| 2017/0054204 A1* | 2/2017 | Changalvala ............ H01Q 1/42 |
| 2017/0187101 A1* | 6/2017 | Freeman .............. H01Q 21/065 |

FOREIGN PATENT DOCUMENTS

| | | | | |
|---|---|---|---|---|
| DE | 102020103638 A1 * | 8/2021 | ............. | B60R 13/00 |
| WO | WO-2016192936 A1 * | 12/2016 | ........... | H01Q 1/1214 |
| WO | WO-2019092255 A1 * | 5/2019 | ........... | H01Q 1/1214 |
| WO | 2020/006127 | 1/2020 | | |

* cited by examiner

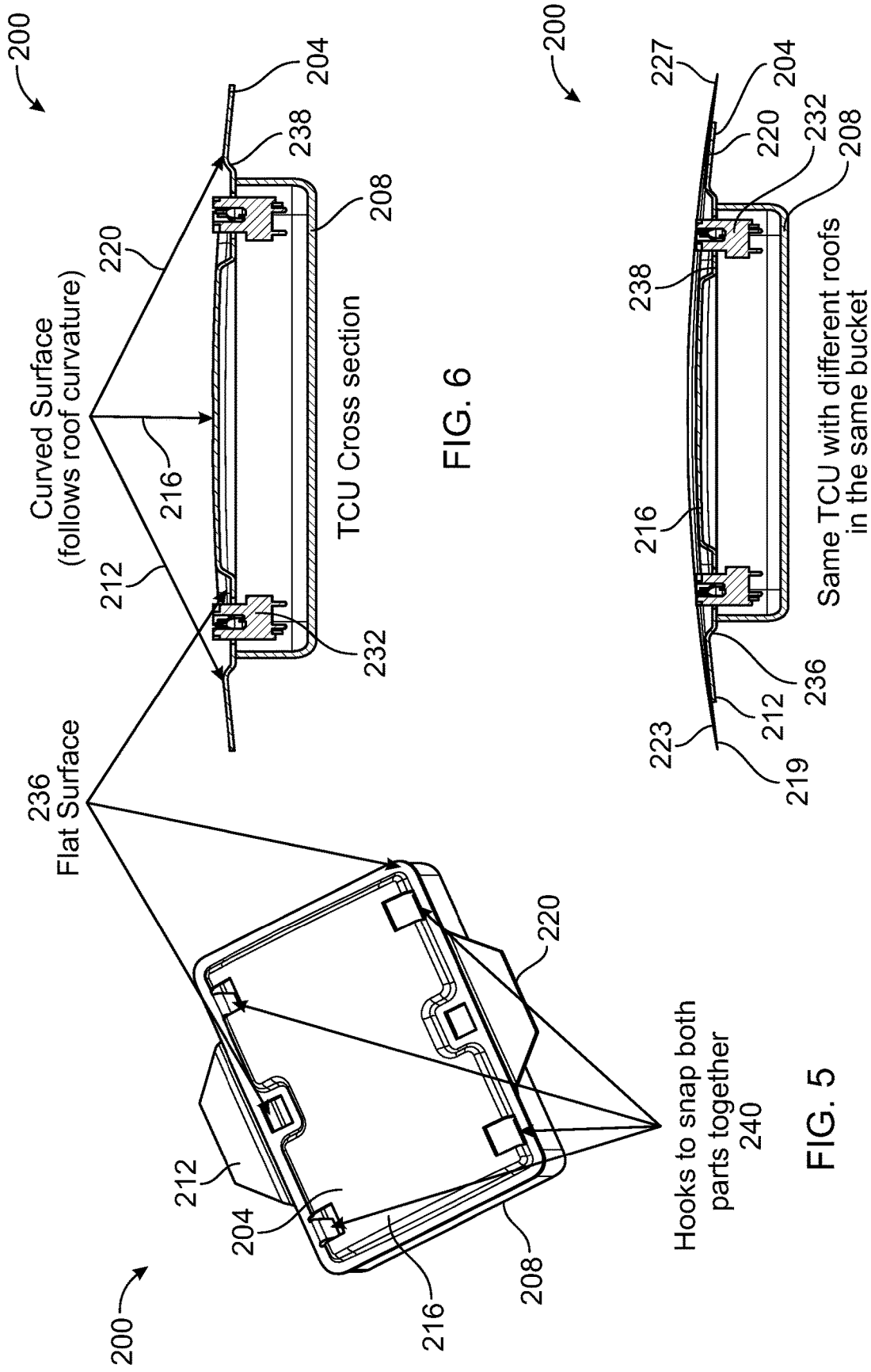

TELECOMMUNICATION CONTROL UNITS (TCUS) HAVING CONTOURED TOP SURFACES TO FOLLOW VEHICLE ROOF CONTOURS

RELATED CASES

This application is a National Phase of International Application No. PCT/US2019/039321, filed on Jun. 26, 2019, claiming priority to and the benefit of U.S. Provisional Patent Application No. 62/690,739 filed Jun. 27, 2018, and U.S. Provisional Patent Application No. 62/700,011 filed Jul. 18, 2018. The entire disclosures of the above applications are incorporated herein by reference.

FIELD

The present disclosure generally relates to telecommunication control units (TCUs) having top surfaces (e.g., defined by mounting brackets, etc.) configured (e.g., curved, non-flat, contoured, etc.) to follow, match, and/or correspond with the contours (e.g., curvatures, non-flat contours, etc.) of vehicle roofs (or other vehicle body walls or mounting surfaces).

BACKGROUND

This section provides background information related to the present disclosure which is not necessarily prior art.

Telecommunication Control Units (TCUs) and antenna assemblies have been integrated to develop smart antenna systems for vehicles. Traditionally, pigtail connectors have been used to provide an electrical connection between the TCUs and the antenna assembly. To reduce costs, board to board connectors have been used instead of pigtail connectors to provide the electrical connection between TCUs and antenna assemblies.

DRAWINGS

The drawings described herein are for illustrative purposes only of selected embodiments and not all possible implementations, and are not intended to limit the scope of the present disclosure.

Figure 3:
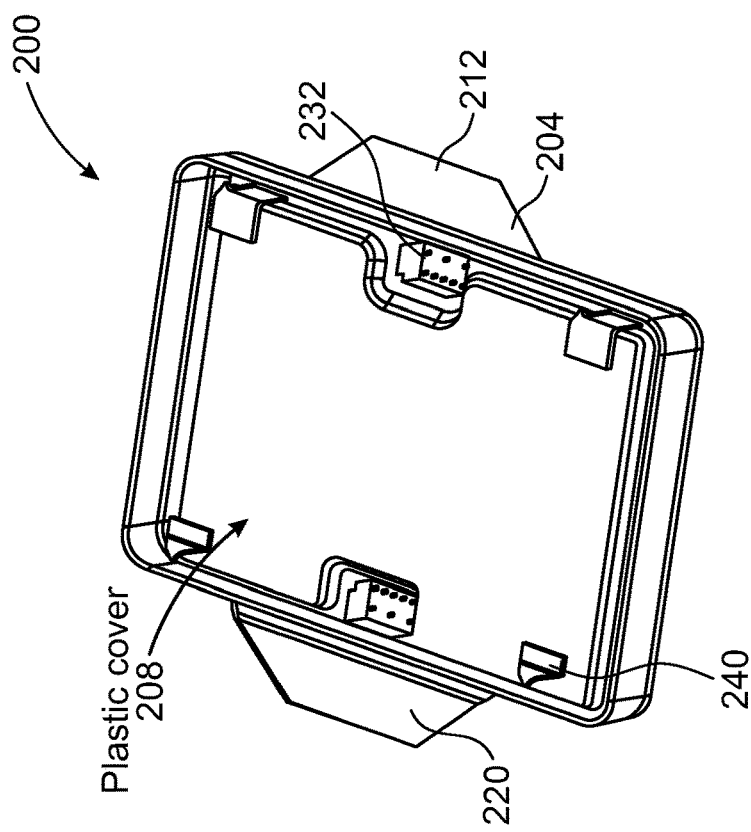
FIG. 3 is an upper perspective view of a support structure (e.g., a mounting bracket, a metal plate, etc.) coupled to a TCU box or cover according to an exemplary embodiment in which the support structure defines a top surface for the TCU that will follow, match, and/or correspond with a contour of a vehicle roof.
Figure 4:
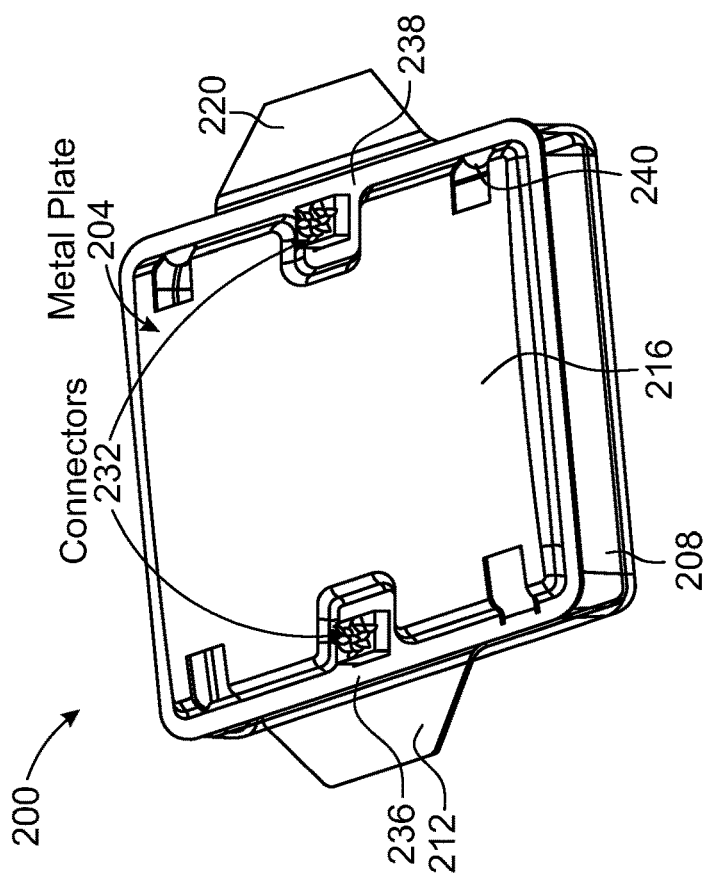

FIG. 4 is a lower perspective view of the support structure and the TCU box or cover shown in FIG. 3. The TCU box or cover is shown translucent for illustrative purposes only in order to illustrate the mechanical connection of the TCU box or cover to the support structure and the portions of the board to board connectors that are within an interior space cooperatively defined by the TCU box or cover and the support structure.

FIG. 5 is a perspective view of the support structure and TCU box or cover shown in FIG. 3 without the board to board connectors. FIG. 5 also shows connectors for mechanically connecting the TCU box or cover to the support structure.

FIG. 6 is a cross-sectional side view of the support structure and TCU box or cover shown in FIG. 3. FIG. 6 illustrates curved portions of the support structure (e.g., mounting bracket, etc.) that define a curved top surface for the TCU that will follow, match, and/or correspond with a vehicle roof's curvature. FIG. 6 also illustrates flat portions of the support structure that are between the curved portions of the support structure. The flat portions define openings in which the board to board connectors are positioned.

FIG. 7 is a cross-sectional side view of the support structure and TCU box or cover shown in FIG. 6 positioned along an interior side of a vehicle roof having a curvature. FIG. 7 also shows the curved top surface of the support structure (e.g., mounting bracket, etc.) following, matching, or corresponding with the curvature of the vehicle roof.

Figure 8:
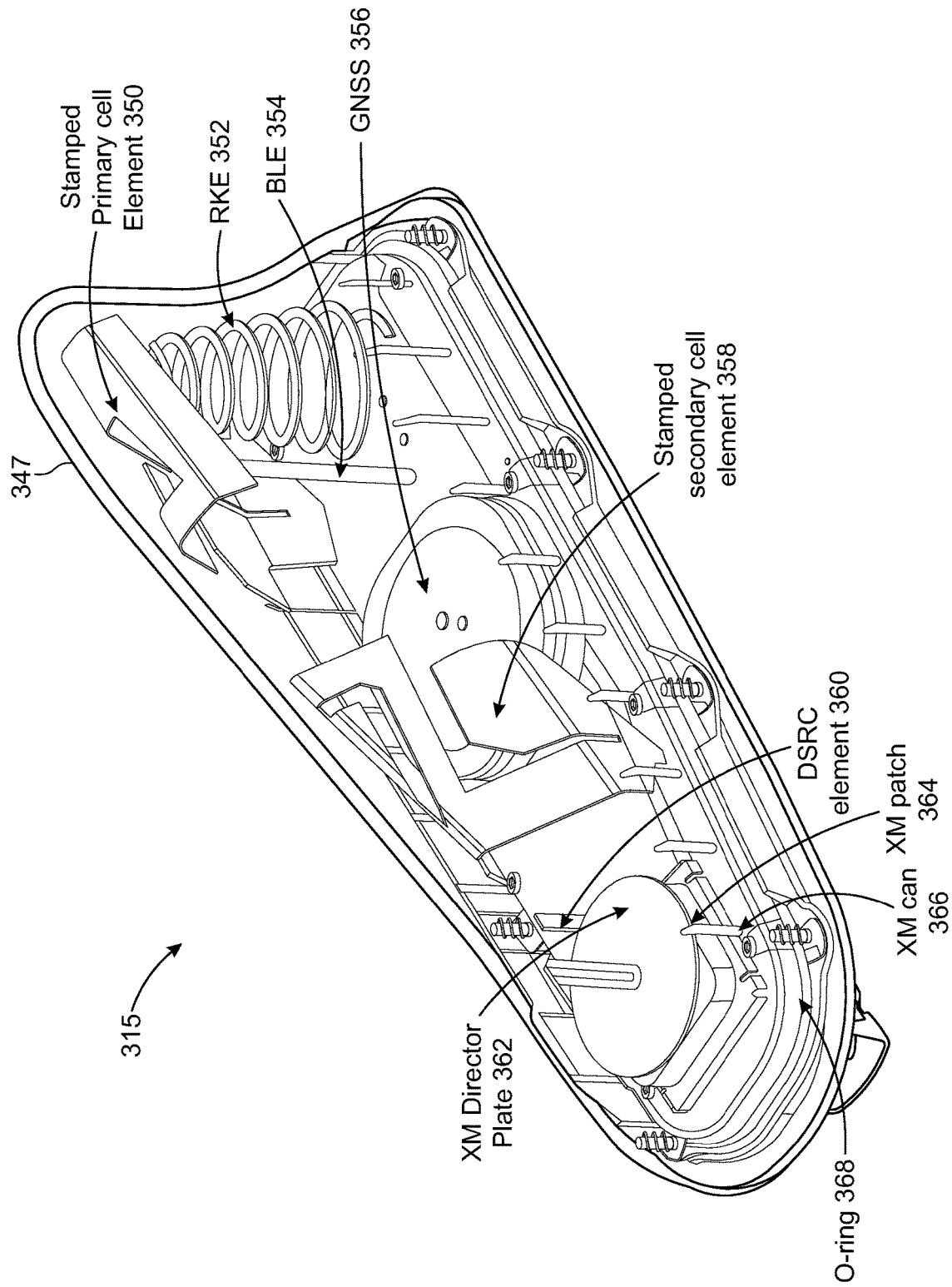
Figure 11:
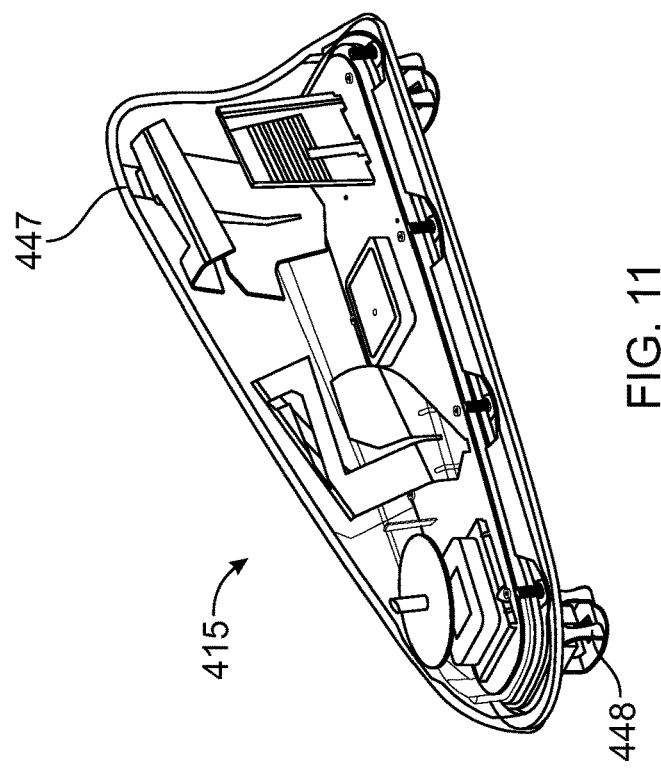
Figure 9:
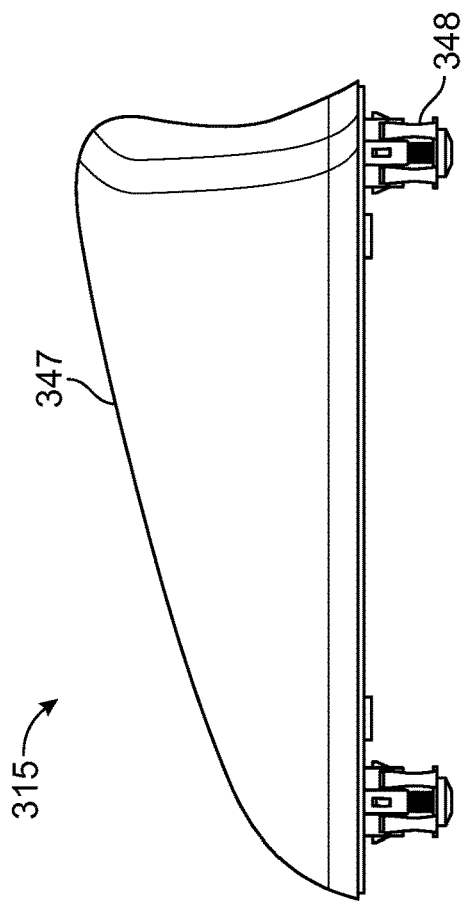
Figure 10:
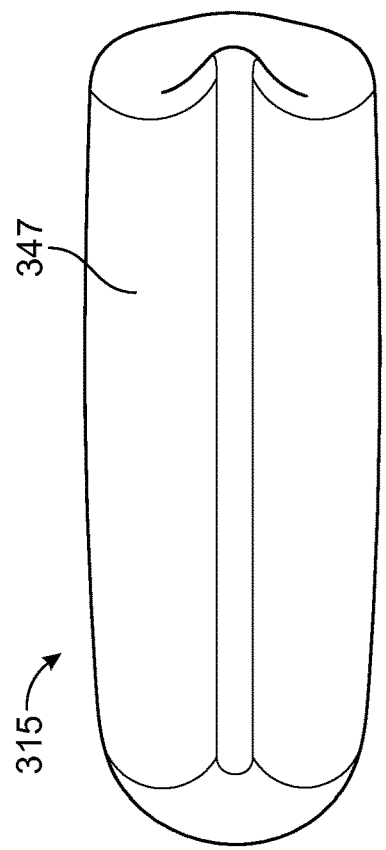
Figure 12:
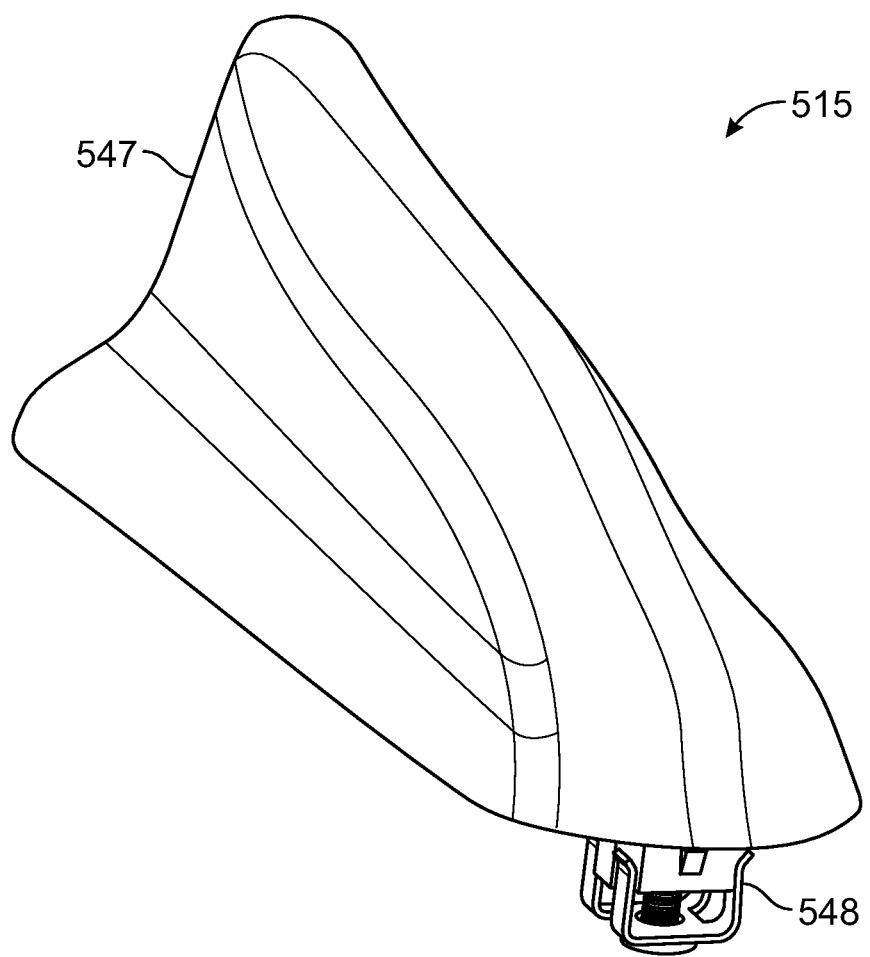

FIGS. 8 through 12 illustrate exemplary vehicular antenna assemblies that may be used with a curved TCU mounting bracket (broadly, a support structure) according to exemplary embodiments. FIGS. 9, 11, and 12 also illustrate exemplary mechanisms for mounting the vehicular antenna assembly to a vehicle body wall (e.g., a curved vehicle roof, etc.).

Figure 13:
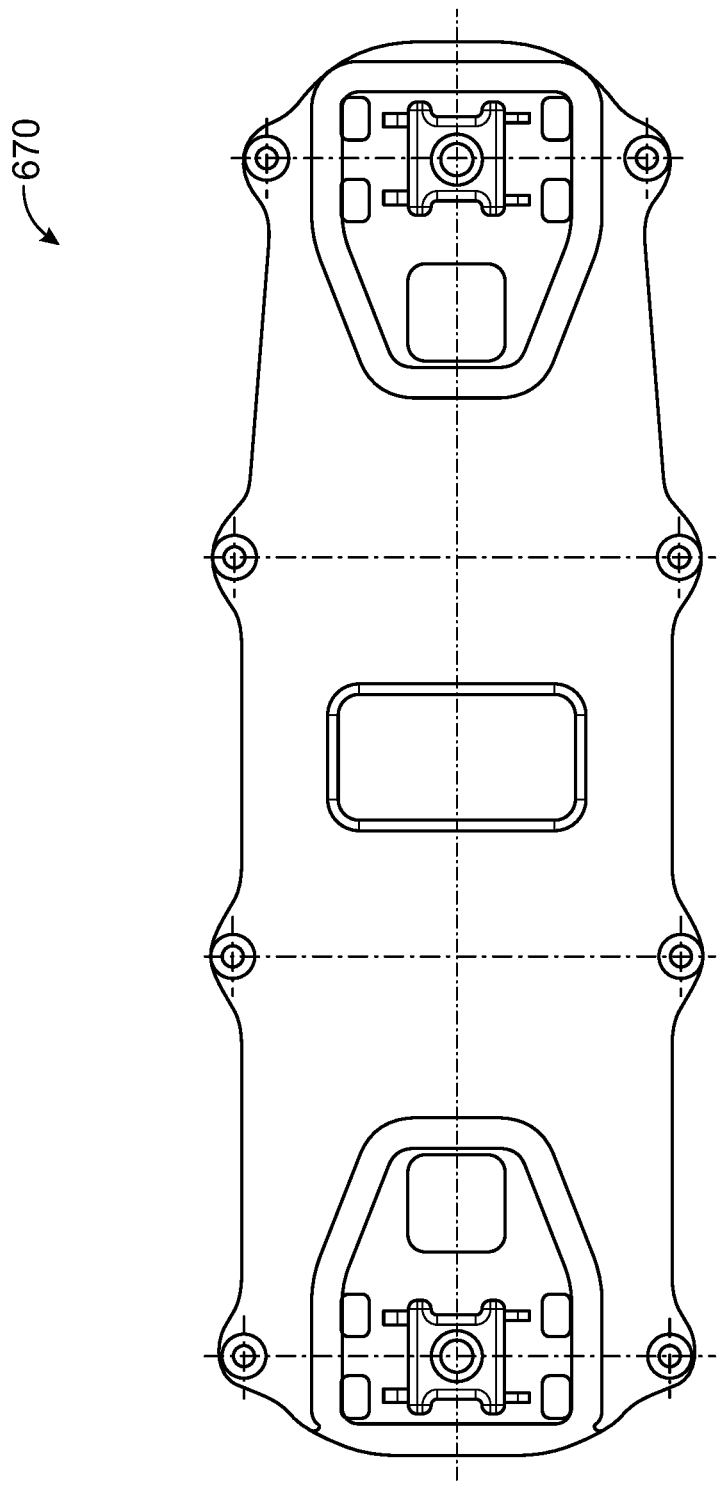

FIG. 13 illustrates an exemplary chassis or base of a vehicular antenna assembly that may be used with a curved TCU mounting bracket (broadly, a support structure) according to exemplary embodiments.

Corresponding reference numerals indicate corresponding (although not necessarily identical) parts throughout the several views of the drawings.

DETAILED DESCRIPTION

Example embodiments will now be described more fully with reference to the accompanying drawings.

Figure 1:
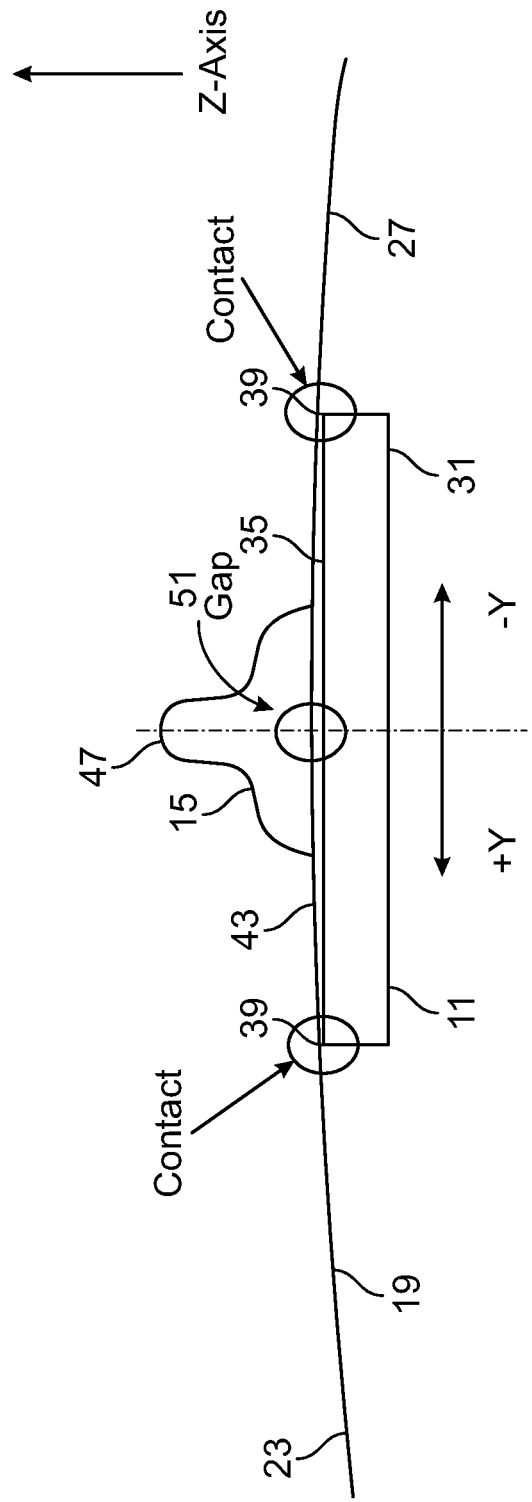
FIG. 1 illustrates a conventional telecommunication control unit (TCU) and an antenna assembly along opposite interior and exterior sides of a vehicle roof.

FIG. 1 illustrates a conventional telecommunication control unit (TCU) 11 and an antenna assembly 15 mounted along opposite interior and exterior sides 19, 23 of a vehicle roof 27 having a curvature. The telecommunication unit (TCU) 11 is mounted inside the vehicle underneath the antenna assembly 15. Board to board connectors may be used to provide the electrical connection between the TCU 11 and the antenna assembly 15.

As show in FIG. 1, the conventional TCU 11 includes a generally rectangular prismatic box 31 having a flat top surface 35. The TCU's flat top surface 35 does not follow, correspond with, or match the curvature of the vehicle roof's interior side 19 along which the TCU 11 is positioned. As the TCU box 31 is fastened (e.g., with screws, other mechanical fasteners, etc.) to the antenna assembly 15, outer edges 39 of the TCU's flat top surface 35 physically contact the vehicle roof's interior side 19, which may cause deformation of the vehicle roof 27.

For example, fastening the TCU box 31 to the antenna assembly 15 may apply forces to the vehicle roof 27, which forces might otherwise allow for a close fit of the TCU's flat top surface 35 to the vehicle roof 27 except for the edge contact of the TCU's flat top surface 35 with the vehicle roof's interior side 19. Instead, a portion 43 of the vehicle roof 27 directly above the TCU's flat top surface 35 may deform, flex, bend, bow, curve, move, etc. downwardly in a direction generally away from the antenna assembly 15 and generally towards the TCU's flat top surface 35. The TCU's flat top surface 35 and the base or chassis of the vehicular antenna assembly 15 may each be more rigid and less flexible than the vehicle roof 27, such that the vehicle roof portion 43 may be deformed without any appreciable deformation of the TCU's flat top surface 35 or deformation of the chassis or base of the antenna assembly 15.

The deformation of the vehicle roof portion 43 may compromise the sealing between the antenna assembly 15 and the vehicle roof 27. For example, a sealing member or dust seal (e.g., an elastomeric sealing member, a rubber sealing member, a thermoplastic elastomer sealing member, etc.) may be disposed along a bottom edge of a radome 47 (e.g., shark fin radome, etc.) of the antenna assembly 15. The sealing member may be compressed between the vehicle roof 27 and the radome's bottom edge to thereby provide a good seal along the interface therebetween that inhibits the ingress of dust, liquid, etc. into the enclosure or interior defined underneath the radome 47. With the vehicle roof deformation, however, portions of the sealing member may not be sufficiently compressed between the vehicle roof 27 and the radome 47 such that a good seal is not provided along the entire interface between the vehicle roof 27 and the radome 47 and/or such that the sealing between the antenna assembly 15 and the vehicle roof 27 is compromised.

With continued reference to FIG. 1, a gap 51 is shown between the TCU's flat top surface 35 and vehicle roof's exterior side 23. This gap 51 may exist due to the physical contact of the TCU's edges 39 with the vehicle roof 27 during the fastening of the TCU box 31 to the antenna assembly 15 and the inability (e.g., inflexibility, rigidness, flat or non-curved contour, etc.) of the TCU's flat top surface 35 to follow the curvature (broadly, contour) of the vehicle roof 27.

Radio frequency (RF) grounding of the antenna assembly 15 and the TCU 11 may be adversely affected (e.g., reduced, degraded, etc.) by the gap 51 and/or by the deformation of the vehicle roof 27. Also, electromagnetic interference (EMI) between the antenna assembly 15 and the TCU 11 may also be adversely affected (e.g., increased, etc.) by the gap 51 and/or by the deformation of the vehicle roof 27.

To overcome problems associated with the vehicle roof deformation and gap between the vehicle roof and TCU, a prior solution includes introducing a flat depression or flat recessed portion into the vehicle roof. For example, FIG. 2 illustrates a conventional telecommunication control unit (TCU) 111 and an antenna assembly 115 mounted along opposite interior and exterior sides 119, 123 of a flat depression or recessed portion 125 of a vehicle roof 127.

The flat depression or recessed portion 125 of the vehicle roof 127 is between first and second curved portions 129, 133 of the vehicle roof 127. The conventional TCU 111 includes a generally rectangular prismatic box 131 having a flat top surface 135.

Figure 2:
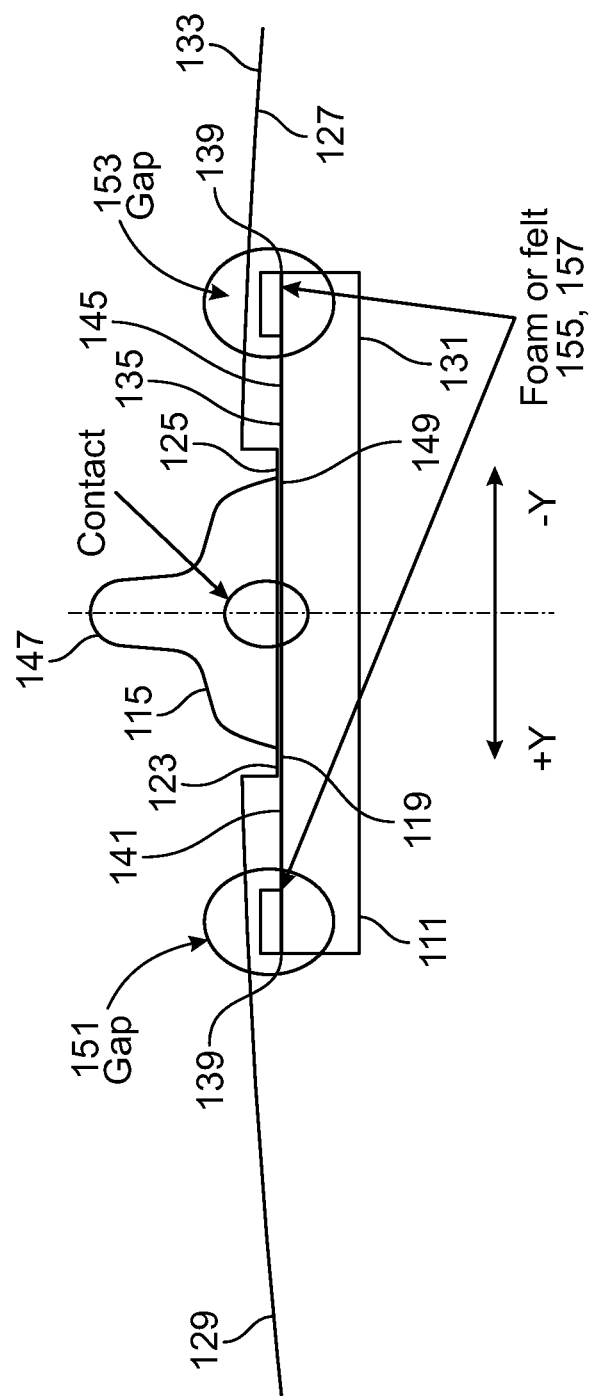
FIG. 2 illustrates a conventional telecommunication control unit (TCU) and an antenna assembly mounted along opposite interior and exterior sides of a flat depression or recessed portion of a vehicle roof.

As shown in FIG. 2, the TCU's flat top surface 135 follows, matches, or corresponds with the flat contour of the interior side 119 of the vehicle roof's flat depression or recessed portion 125. A portion of the TCU's flat top surface 135 is positioned flush against the interior side 119 of the vehicle roof's flat depression or recessed portion 125 with good (e.g., substantially perfect, etc.) surface to surface contact and/or without any appreciable gaps (e.g., without any gaps, etc.) between the TCU's flat top surface 135 and the interior side 119 of the vehicle roof's flat depression or recessed portion 125. Likewise, the antenna assembly 115 may also be positioned flush against the exterior side 123 of the vehicle roof's flat depression or recessed portion 125 with good (e.g., substantially perfect, etc.) surface to surface contact and/or without any appreciable gaps (e.g., without any gaps, etc.) between a bottom of the antenna assembly 115 and the exterior side 123 of the vehicle roof's flat depression or recessed portion 125.

Accordingly, the introduction of the flat depression or flat recessed portion 125 into the vehicle roof 127 allows for good (e.g., substantially uniform, etc.) compression of a sealing member between the vehicle roof 127 and a bottom edge of a radome 147 of the antenna assembly 115. With the good compression, the sealing member may thus provide a good seal along the interface between the vehicle roof 127 and the bottom edge of the radome 147, which seal inhibits the ingress of dust, liquid, etc. into the enclosure or interior defined underneath the radome 147.

Although a middle portion 149 of the TCU's flat top surface 135 follows the flat contour of the interior side 119 of the vehicle roof's flat depression or recessed portion 125, the TCU's first and second outer portions 141, 145 do not follow, correspond with, or match the curvature of the respective vehicle roof's first and second curved portions 129, 133. Accordingly, FIG. 2 shows a first gap 151 between the TCU's first outer portion 141 and the vehicle roof's first curved portion 129. FIG. 2 also shows a second gap 153 between the TCU's second outer portion 145 and the vehicle roof's second curved portion 133.

Because the TCU's first and second outer portions 141, 145 do not physically contact the respective vehicle roof's first and second curved portions 129, 133, first and second members 155, 157 (e.g., foam pads, felt, elastomer, other pieces or pads of material, etc.) may be respectively positioned adjacent the TCU's outer edges 139 within the first and second gaps 151, 153. The members 155, 157 may help inhibit movement of the TCU's first and second outer portions 141, 145 relative to the vehicle roof's first and second curved portions 129, 133. The members 155, 157 may inhibit vibrations of the TCU's first and second outer portions 141, 145 during travel of the vehicle to which the TCU 111 is mounted.

The proposed solution shown in FIG. 2 may thus overcome problems associated with the TCU installation shown in FIG. 1. But this proposed solution needs to have a flat depression introduced into the vehicle roof, which tends to increase costs and which is not able to be retrofitted to existing vehicles having curved roofs without any flat depressions or flat recessed portions.

After recognizing the above, exemplary embodiments were developed and are disclosed herein of mounting brackets (broadly, support structures) for telecommunication control units (TCUs) that are configured (e.g., curved, non-flat, contoured, etc.) to define the top surfaces for the TCUs such that the top surfaces follow, match, and/or correspond with the contours (e.g., curvatures, non-flat contours, etc.) of vehicle roofs (or other vehicle body walls or mounting surfaces). In exemplary embodiments, a support structure (e.g., a mounting bracket, a metal plate, etc.) is attachable to a TCU box or cover (e.g., attachable to plastic cover or housing, attachable to the TCU itself without a separate cover, etc.). The support structure includes one or more portions (e.g., one or more curved, non-flat, and/or contoured portions, etc.) defining a top surface for the TCU. The top surface defined by the support structure for the TCU is configured (e.g., curved, non-flat, contoured, etc.) so that the top surface will follow, match, and/or correspond with a contour (e.g., a curvature, a non-flat contour, etc.) of a vehicle roof (or other vehicle body wall or mounting surface).

In exemplary embodiments, a plurality of TCU support structures (e.g., mounting brackets, metal plates, etc.) may be configured differently (e.g., with more or less curvature, with a different contour, etc.) for different vehicle roofs depending on the different vehicle roof contours (e.g., different curvatures, different non-flat contours, etc.). The configuration of the TCUs may remain the same for the different vehicle roofs. Although the support structures may be configured with different contours to match or correspond with the different vehicle roof contours, the TCU box or cover may still be attachable to any of the different support structures. Advantageously, this may allow multiple support structures with different contours to be used with and assembled to the same or common TCU (e.g., same or common TCU box or cover, etc.), which should help reduce installation errors and logistical issues in assembly plants. Accordingly, aspects of the present disclosure may allow for use of a common TCU (e.g., a common TCU box or cover design, etc.) across a wide range of vehicles having different roof contours. By allowing the same TCU boxes or covers to be assembled with different support structures that are configured for use across different vehicle types, aspects of the present disclosure allow for common parts and tooling, which may, in turn, allow for reduced costs.

Exemplary embodiments disclosed herein may provide or include one or more (but not necessarily, any or all) of the following advantages and/or features. For example, exemplary embodiments disclosed herein may provide good RF grounding of the antenna assembly and the TCU, e.g., better than the RF grounding of the antenna assembly 15 and TCU 11 show in FIG. 1, etc. As another example, exemplary embodiments disclosed herein may reduce EMI between a TCU and an antenna assembly (e.g., antenna assembly 315 shown in FIG. 8, etc.) as compared to the EMI between the TCU 11 and antenna assembly 15 shown in FIG. 1. As a further example, there is significantly less deformation (e.g., no deformation, no appreciable deformation, no significant deformation, etc.) of the vehicle roof (e.g., vehicle roof 227 in FIG. 7, etc.) in exemplary embodiments disclosed herein as compared to the deformation of the vehicle roof 27 shown in FIG. 1. In exemplary embodiments disclosed herein, there is no need to locally depress the vehicle roof to secure a good seal. This is unlike FIG. 2 in which a flat depression 125 was introduced or added to the vehicle roof 127 in order to obtain a good seal between the antenna assembly 115 and the vehicle roof 127.

With reference to FIGS. 3 through 7, there is shown an exemplary embodiment of a mounting bracket 204 (broadly, a support structure) embodying one or more aspects of the present disclosure. As disclosed herein, the mounting bracket 204 may be used for mounting a telecommunication control unit (TCU) 200 to a vehicle body wall (e.g., vehicle roof or other mounting surface, etc.). In FIGS. 3 through 7, the mounting bracket 204 is shown coupled to a TCU box or cover 208.

The mounting bracket 204 is configured (e.g., curved, non-flat, contoured, etc.) to define a top surface for the TCU 200 such that the top surface is configured (e.g., curved, non-flat, contoured, etc.) to follow, match, and/or correspond with a contour (e.g., a curvature, non-flat contour, etc.) of a vehicle roof 227 (FIG. 7) (broadly, a mounting surface). In the illustrated exemplary embodiment shown in FIGS. 3, 5, 6, and 7, the mounting bracket 204 includes first, second, and third curved portions 212, 216, 220. The second curved portion 216 is generally between the first and third curved portions 212, 220.

As shown in FIG. 7, the first, second, and third curved portions 212, 216, 220 (broadly, contoured or non-flat portions) of the TCU mounting bracket 204 follow, match, and/or correspond with the curvature of the vehicle roof 227. Accordingly, the first, second, and third curved portions 212, 216, 220 may be positioned substantially flush against the interior side 219 of the vehicle roof 227 with good (e.g., substantially perfect, etc.) surface to surface contact and/or without any appreciable gaps (e.g., without any gaps, with a substantially zero-gap, etc.) between the curved portions 212, 216, 220 of the TCU mounting bracket 204 and corresponding curved portions of the vehicle roof 227.

In this illustrated exemplary embodiment, the first, second, and third curved portions 212, 216, 220 may be positioned against the vehicle's roof's interior side 219 with substantially zero-gap therebetween in a final installed position in which the TCU 200 is along the vehicle's roof's interior side 219 and coupled (e.g., mechanically fastened, etc.) to an antenna assembly along the vehicle's roof's exterior side 223.

The TCU 200 may be disposed underneath (e.g., directly underneath, etc.) the antenna assembly in the final installed position. The antenna assembly may be a smart antenna assembly having a radome with a shark fin shape, styling, or configuration, such as the antenna assembly 315 and radome 347 shown in FIG. 8, etc. By way of example only, an antenna assembly may first be assembled or installed to the vehicle roof 227 (FIG. 7) from outside the vehicle. Then from inside the vehicle, the mounting bracket 204 may be coupled or attached to the vehicular antenna assembly. The TCU 200 may be preassembled to the mounting bracket 204 before the mounting bracket 204 is coupled to the vehicular antenna assembly. Or, the TCU 200 may be assembled to the mounting bracket 204 after the mounting bracket 204 has been coupled to the vehicular antenna assembly.

As shown in FIGS. 3, 6, and 7, connectors 232 (e.g., board to board connectors, etc.) may be used to provide the electrical connection between the TCU 200 and the antenna assembly. The connectors 232 are positioned within openings defined by flat portions 236 of the mounting bracket 204. The flat portions 236 may define a flat perimeter portion (e.g., rim, lip, flange, shoulder, etc.) disposed at least partially (e.g., entirely, etc.) around a perimeter of the second curved middle portion 216 of the mounting bracket 204.

A first flat portion 236 may be disposed between the first and second curved portions 212, 216 such that the first and second curved portions 212, 216 are spaced apart from each other and separated by the first flat portion 236 of the mounting bracket 204. A second flat portion 238 may be disposed between the second and third curved portions 216, 220 such that the second and third curved portions 216, 220 are spaced apart from each other and separated by the second flat portion 238 of the mounting bracket 204.

FIGS. 3, 4, and 5 illustrate exemplary connectors 240 (e.g., hooks, latches, snap clip members, latching mechanisms, etc.) for mechanically coupling (e.g., snapping together, etc.) the mounting bracket 204 to the TCU box or cover 208. For example, the mounting bracket 204 may include hooks 240 for snapping the mounting bracket 204 and the TCU box or cover 208 together. Alternatively, or additionally, mechanical fasteners (e.g., screws, other fastening devices, etc.) may also be used for securing the TCU box or cover 208 to the mounting bracket 204. Alternative embodiments may include other means for attaching the TCU 200 and/or the TCU box or cover 208 to the mounting bracket 204, such as by ultrasonic welding, interference or snap fit, solvent welding, heat staking, latching, bayonet connections, hook connections, integrated fastening features, mechanical fasteners, combinations thereof, etc.

The TCU box or cover 208 is configured to fit over the various TCU components such that the TCU components are within an interior space cooperatively defined by the TCU box or cover 208 and the mounting bracket 204 when the TCU box or cover 208 and the mounting bracket 204 are coupled together. The cover 208 is configured to protect the relatively fragile TCU components from damage due to environmental conditions, vibrations, shock during use, etc. By way of example, the TCU components may include one or more fans for air circulation, TCU electronics, printed circuit boards (PCBs), connectors, microprocessors, etc. In addition, the TCU 200 may include its own enclosure in which the various TCU components are enclosed, such that a separate cover may not be needed. In which case, the TCU 200 may be mounted or installed directly to the mounting bracket 204 without a separate cover.

By way of example only, the mounting bracket 204 may comprise a metal bracket or plate that is made by metal sheet forming. Or, for example, the mounting bracket 204 may comprise a metal bracket or plate formed by die casting zinc. Alternatively, the mounting bracket 204 may be formed by a different process other than metal sheet forming or die casting (e.g., stamping, drawing, etc.) and/or be formed from a different material than zinc, including other metals, metal alloys, non-metals, composite materials, etc.

The TCU box or cover 208 may be formed from a wide range of materials, such as polymers, urethanes, plastic materials (e.g., polycarbonate blends, Polycarbonate-Acrylnitril-Butadien-Styrol-Copolymer (PC/AB S) blend, etc.), glass-reinforced plastic materials, synthetic resin materials, thermoplastic materials (e.g., GE Plastics Geloy® XP4034 Resin, etc.), among other suitable materials.

FIGS. 8 through 12 illustrate exemplary vehicular antenna assemblies 315, 415, 515 that may be used with a curved TCU mounting bracket (broadly, a support structure) according to exemplary embodiments. FIG. 13 illustrates an exemplary chassis or base 670 of a vehicular antenna assembly (e.g., 315 (FIG. 8), 415 (FIG. 11), 515 (FIG. 12), etc.) that may be used with a curved TCU mounting bracket (broadly, a support structure) according to exemplary embodiments.

The antenna assemblies 315, 415, 515 and chassis or base 670 are examples only. In other exemplary embodiments, an antenna assembly may be configured differently, such as with a differently configured radome, with more or less antenna elements, with antenna elements operable with different frequencies and/or bandwidths, etc.

As shown in FIGS. 9, 11, and 12, the exemplary vehicular antenna assemblies 315, 415, 515 include radomes 347, 447, 547 and mechanisms 348, 448, 548, respectively, for mounting the vehicular antenna assemblies 315, 415, 515 to vehicle body walls (e.g., curved vehicle roofs, etc.). The antenna assemblies 315, 415, 515 and their respective mounting mechanisms 348, 448, 548 may be configured to allow the respective antenna assembly to be installed and fixedly mounted to a body wall of a vehicle after being inserted into a mounting hole in the body wall from an external side of the vehicle and nipped from an interior compartment side of the vehicle.

With continued reference to FIG. 8, the vehicular antenna assembly 315 includes a plurality of antenna elements operable with different frequencies and/or bandwidths. As shown in FIG. 8, the vehicular antenna assembly 315 includes a first or primary cellular antenna 350 (e.g., stamped primary cellular antenna element, etc.), a remote keyless entry (RKE) antenna 352 (e.g., coil radiator, PCB antenna, etc.), a Bluetooth Low Energy (BLE) antenna 354, a Global Navigation Satellite System (GNSS) antenna 356 (e.g., patch antenna, etc.), a second or secondary cellular antenna 358 (e.g., stamped secondary cellular antenna element, etc.), a Dedicated Short Range Communication (DSRC) antenna 360, and an Satellite Digital Audio Radio Service (SDARS) antenna 364 (e.g., patch antenna, etc.).

Also shown in FIG. 8 are a reflector 362 (e.g., director plate, etc.) and a SDARS can 366. The reflector 362 may be configured for reflecting or directing SDARS signals generally towards the SDARS antenna 364. A sealing member 368 (e.g., O-ring, other elastomeric compressible sealing member, etc.) is disposed along a lower portion of the radome 347.

In this exemplary embodiment, the primary cellular antenna element 350 may be monopole antenna (e.g., stamped metal wide band monopole antenna mast, etc.) configured to be operable for both receiving and transmitting communication signals within one or more cellular frequency bands (e.g., Long Term Evolution (LTE), etc.). The secondary cellular antenna element 358 may be configured to be operable for receiving (but not transmitting) communication signals within one or more cellular frequency bands (e.g., LTE, etc.).

The GNSS antenna 356 may comprise a patch antenna configured to be operable for receiving Global Navigation Satellite System (GNSS) signals or frequencies (e.g., Global Positioning System (GPS), BeiDou Navigation Satellite System (BDS), the Russian Global Navigation Satellite System (GLONASS), other satellite navigation system frequencies, etc.). The SDARS antenna 364 may comprise a patch antenna configured to be operable for receiving SiriusXM satellite radio signals or frequencies. Although the GNSS and SDARS patch antennas 356, 364 are horizontally spaced apart from each other in this exemplary embodiment, the GNSS and SDARS patch antennas 356, 364 may be in a stacked arrangement with the GNSS patch antenna 356 stacked on top of the SDARS patch antenna 364 in other exemplary embodiments.

The various antenna elements 350 to 360 shown in FIG. 8 are examples only as other exemplary embodiments may be used with other antenna assemblies including more or less antenna elements and/or antenna elements operable with different frequencies and/or bandwidths, etc.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A telecommunication control unit configured for installation along a vehicle body wall having a contour, the telecommunication control unit comprising a top surface contoured to match and/or correspond with the contour of the vehicle body wall, whereby the top surface is positionable substantially flush against the vehicle body wall and/or the top surface is positionable against the vehicle body wall substantially without any gap between the top surface and the vehicle body wall, wherein:
the telecommunication control unit includes a support structure that includes a contoured portion that defines, at least in part, the top surface;

the support structure further comprises a flat portion disposed at least partially around a perimeter of the contoured portion; and the flat portion of the support structure defines an opening and the telecommunication control unit includes a connector aligned with the opening and configured to mate with a connector provided by an antenna assembly when the telecommunication control unit and the antenna assembly are installed along opposite interior and exterior sides, respectively, of the vehicle body wall.

2. The telecommunication control unit of claim 1, wherein:

the telecommunication control unit is configured for installation along an interior side of a vehicle roof having a curvature; and the top surface has a curvature matching and/or corresponding with the curvature of the interior side of the vehicle roof such that the top surface is positionable substantially flush against the interior side of the vehicle roof substantially without any gap between the top surface and the interior side of the vehicle roof.

3. The telecommunication control unit of claim 1, wherein the telecommunication control unit includes a box or cover configured to be coupled to the support structure.

4. The telecommunication control unit of claim 1, wherein:

the contoured portion is a second contoured portion;

the support structure further includes a first contoured portion and a third contoured portion;

the second contoured portion is generally between the first and third contoured portions; and the first, second, and third contoured portions define the top surface and are positionable substantially flush against the vehicle body wall substantially without any gap between the vehicle body wall and the corresponding first, second, and third contoured portions.

5. The telecommunication control unit of claim 4, wherein the flat portion is disposed entirely around a perimeter of the second contoured portion.

6. A telecommunication control unit configured for installation along a vehicle body wall having a contour, the telecommunication control unit comprising a top surface contoured to match and/or correspond with the contour of the vehicle body wall, whereby the top surface is positionable substantially flush against the vehicle body wall and/or the top surface is positionable against the vehicle body wall substantially without any gap between the top surface and the vehicle body wall;

wherein:

the telecommunication control unit includes a support structure that includes a first contoured portion, a second contoured portion, and a third contoured portion that define the top surface;

the second contoured portion is generally between the first and third contoured portions;

the first, second, and third contoured portions are positionable substantially flush against the vehicle body wall substantially without any gap between the vehicle body wall and the corresponding first, second, and third contoured portions;

the support structure further comprises a flat portion disposed at least partially around a perimeter of the second contoured portion; and the flat portion of the support structure defines an opening and the telecommunication control unit includes a connector aligned with the opening and configured to mate with a connector provided by an antenna assembly when the telecommunication control unit and the antenna assembly are installed along opposite interior and exterior sides, respectively, of the vehicle body wall.

7. An antenna system comprising:

a telecommunication control unit configured for installation along an interior side of a vehicle body wall having a contour, the telecommunication control unit comprising a top surface contoured to match and/or correspond with the contour of the vehicle body wall, the telecommunication control unit having a first connector;

an antenna assembly configured to mount on an exterior side of the vehicle body wall, the antenna assembly having a second connector, wherein the telecommunication control unit and the antenna assembly are configured for installation along respective interior and exterior sides of a vehicle roof; and the top surface has a curvature matching and/or corresponding with a curvature of the interior side of the vehicle roof such that the top surface is positionable substantially flush against the interior side of the vehicle roof substantially without any gap between the top surface and the interior side of the vehicle roof and the first connector mates with the second connector:

wherein:

the telecommunication control unit includes a support structure that includes a contoured portion that defines, at least in part, the top surface;

the support structure further comprises a flat portion disposed at least partially around a perimeter of the contoured portion; and the flat portion of the support structure defines an opening in which the first connector is positioned.

8. The antenna system of claim 7, wherein the first and second connectors are board-to-board connectors.

9. A method of mounting a telecommunication control unit (TCU) to an interior side of a vehicle body wall, comprising positioning a top surface of the TCU flush against the vehicle body wall, wherein the top surface is contoured to match and/or correspond with a contour of the vehicle body wall such that positioning the top surface flush against the vehicle body wall substantially avoids any gap between the top surface and the vehicle body wall, wherein:

the top surface is defined at least in part by a contoured portion of a mounting bracket;

the mounting bracket further comprises a flat portion disposed at least partially around a perimeter of the contoured portion;

the flat portion of the mounting bracket defines an opening, and the telecommunication control unit includes a connector aligned with the opening and configured to mate with a connector provided by an antenna assembly when the TCU and the antenna assembly are installed along the interior side and an exterior side, respectively, of the vehicle body wall; and positioning the top surface of the TCU flush against the vehicle body wall comprises positioning the contoured portion of the mounting bracket against the vehicle body wall.

10. The method of claim 9, further comprising coupling a TCU box or cover to the mounting bracket.

11. The method of claim 9, further comprising:

positioning a vehicular antenna assembly on an exterior side of the vehicle body wall; and coupling the mounting bracket to the vehicular antenna assembly from the interior side.

12. The telecommunication control unit of claim 1, wherein the connector of the telecommunication control unit and the connector of the antenna assembly are board-to-board connectors.

13. The telecommunication control unit of claim 1, wherein:
the contoured portion is a second contoured portion;
the support structure further includes a first contoured portion and a third contoured portion;
the second contoured portion is generally between the first and third contoured portions;
the first and second contoured portions are separated and spaced apart from each other by a first portion of the flat portion between the first and second contoured portions; and
the second and third contoured portions are separated and spaced apart from each other by a second portion the flat portion between the second and third contoured portions.

14. The telecommunication control unit of claim 1, wherein the flat portion is disposed entirely around the perimeter of the contoured portion.

15. The telecommunication control unit of claim 1, wherein the support structure comprises a mounting bracket.

16. The antenna system of claim 7, wherein:
the contoured portion is a second contoured portion;
the support structure further includes a first contoured portion and a third contoured portion;
the second contoured portion is generally between the first and third contoured portions; and
the first, second, and third contoured portions define the top surface and are positionable substantially flush against the vehicle body wall substantially without any gap between the vehicle body wall and the corresponding first, second, and third contoured portions.

17. The antenna system of claim 7, wherein the flat portion is disposed entirely around the perimeter of the contoured portion.

18. The antenna system of claim 7, wherein:
the support structure comprises a mounting bracket; and
the telecommunication control unit comprises a box or cover coupled to the mounting bracket.

19. The method of claim 9, wherein:
the contoured portion is a second contoured portion;
the mounting bracket further includes a first contoured portion and a third contoured portion;
the second contoured portion is generally between the first and third contoured portions; and
the first, second, and third contoured portions define the top surface and are positionable substantially flush against the vehicle body wall substantially without any gap between the vehicle body wall and the corresponding first, second, and third contoured portions.

20. The method of claim 9, wherein the flat portion is disposed entirely around the perimeter of the contoured portion.

* * * * *